Jan. 15, 1935. E. H. PETERSON 1,987,634
LAWN TRIMMER
Filed April 29, 1933
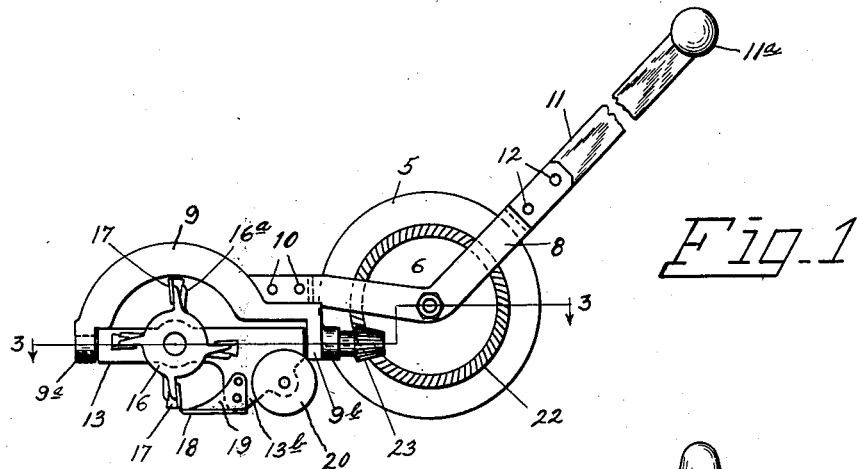
*Fig. 1*
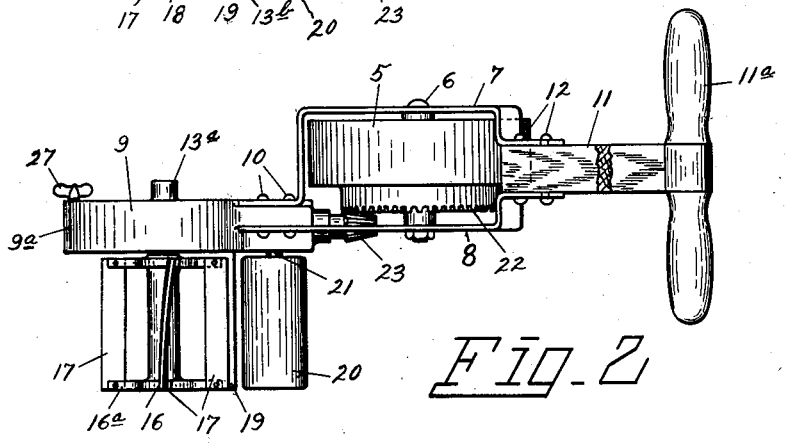
*Fig. 2*
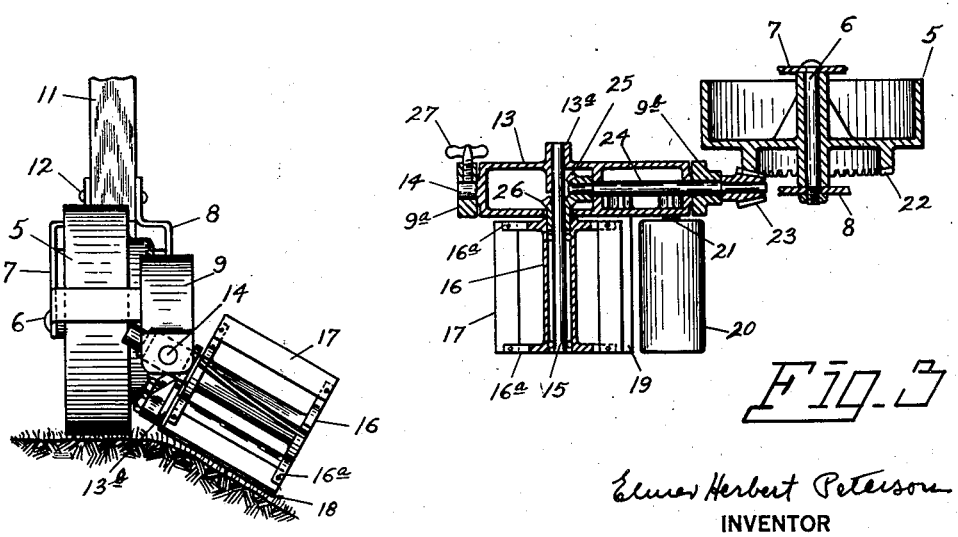
*Fig. 3*
*Fig. 4*
Elmer Herbert Peterson
INVENTOR

UNITED STATES PATENT OFFICE 1,987,634

LAWN TRIMMER

Elmer Herbert Peterson, Seattle, Wash., assignor of one-half to Arvid J. Peterson, Seattle, Wash.

Application April 29, 1933, Serial No. 668,567

5 Claims. (Cl. 56—252)

My present invention relates to improvements in lawn trimmers which, while being capable of performing the usual functions of a lawn mower, are especially adapted to trimming various places upon and about a lawn or greensward which can not ordinarily be trimmed with the commonly known type of lawn mower.

An object of the invention is to provide a trimming device having an outboard cutting mechanism disposed to one side of the machine proper, and having no outboard support projecting beyond said cutting mechanism, thereby making it possible to trim very close to buildings, fences, fountains, flower beds, and other various objects.

A further object of the invention is to provide a trimming device having a pivotally mounted outboard cutting mechanism adapted for swingable movement, whereby the cutting mechanism may automatically incline itself from its normal horizontal position, thus making it possible to trim grass on narrow inclined surfaces such as are around the edges of flower beds, along the edges of sidewalks, etc.

Further objects and advantages of the invention will become apparent from a study of the hereinafter detailed description and the drawing relating thereto.

My invention contemplates a lawn trimming device having a single supporting and driving wheel pivotally mounted between a pair of frame sills which support at their forward ends a main frame to which the cutting mechanism is mounted and which are secured at their rear ends to a suitable handle by which the machine may be propelled and guided by the operator. The main frame is supported preferably forward and to one side of the driving wheel, and is adapted to support a sub-frame which is pivotally mounted therein on an axis at right angles to the axis of the driving wheel. Rotatably mounted in the sub-frame, and disposed to one side thereof is a rotary cutter reel having a plurality of curved cutting blades operating in conjunction with a fixed shear blade supported by the sub-frame, and the cutter reel is adapted to be rotatively driven from the single supporting and driving wheel by means of suitable gearing interposed therebetween. The pivotal mounting of the sub-frame which carries the cutting mechanism permits the latter to incline upwardly or downwardly so as to cut on abruptly inclined surfaces while the driving wheel runs on a level surface, and an idler roller carried by the subframe immediately behind the cutter reel serves to support the pivotally mounted cutting mechanism at the proper height above the ground at all times.

The invention thus resides in certain novel combinations and arrangements of parts as will hereinafter be more fully set forth and described.

In the accompanying drawing I have illustrated one complete example of the physical embodiment of my invention wherein the parts are combined and arranged according to the best mode I have thus far devised for the practical application of the principles of my invention.

Figure I is a view in side elevation of my lawn trimming machine. Figure II is a top plan view of the machine. Figure III is a sectional plan view of the device as taken on line 3—3 of Figure I. Figure IV is a front elevational view of the machine showing in illustrative manner how the cutting mechanism may incline to cut on abruptly inclined surfaces while the driving wheel may remain on substantially level surfaces.

In that embodiment of my invention shown in the drawing, I employ a single supporting and driving wheel 5 which is rotatably mounted on a shaft 6 between opposite side sills 7 and 8 of a main frame structure comprising a forward end portion 9 secured by bolts or rivets 10 and a rearwardly and upwardly extending handle 11 attached by rivets or bolts 12. The handle 11 forms the medium by which the machine may be propelled and by which the frame may be tilted about the wheel axis to regulate the elevation of the forward portion and it is accordingly fitted with a transverse handle bar 11a.

As best shown in Figure I, the forward end portion 9 of the frame is preferably arched in shape. It extends forwardly of the wheel and in the direction of normal travel and is provided at front and rear ends with depending end portions 9a and 9b. Pivotally mounted between the end portions 9a and 9b of the frame portion 9 is a rectangular sub-frame 13 having its forward end pivoted in the end portion 9a by means of an integral trunnion 14, and having its rear end pivoted about a shaft 24 extending thru the end portion 9b and axially aligned with the trunnion 14, as will be presently described.

Fixed in a boss 13a formed on the outside longitudinal rail of the subframe 13, and extending transversely through and beyond the rail at the other side of said subframe, is a stationary axle shaft 15 on which a rotary cutter reel 16 is rotatably mounted, as best seen in Figure III. The reel 16 is fashioned with a plurality of radially extending arms 16a to which curved cutting blades 17 are secured. The cutting edges of the blades 17 are adapted to co-act with a shear blade 18 which is disposed below the cutter reel 16, and which is carried by an adjustable shear blade holder 19 mounted on a depending portion 13b of the sub-frame 13. Since the sub-frame 13 is pivotally mounted at its ends in the part 9 it will be apparent that the cutter reel 16 is free to swing radially about the axial line of the sub-frame pivots, and the reel 16 and shear blade 18 thus follow the contour of the ground and may incline upwardly or downwardly from the side of the machine so as to trim the grass on inclined surfaces such as may be found around the edges of flower beds, along the edges of walks, etc. As a means of supporting the shear blade 18 and the cutter reel 16 at the proper height above the ground I provide an idler roller 20 which is disposed to the rear of the shear blade 18 and which is rotatably supported on a shaft 21 carried by the depending portion 13b of the sub-frame 13 and parallel with the shaft 15.

The rotary cutter reel 16 is driven by a driving connection with the wheel 5. The driving mechanism comprises a beveled gear wheel 22 co-axial of wheel 5 and preferably integral therewith and meshing with a pinion gear 23 secured on the rear end of the shaft 24 which is journaled in the rearward end portion of the main frame and likewise in a cross web in the sub-frame 13 in axial alinement with the trunnion 14. The shaft 24 thus provides the rear pivotal support for the subframe. Secured to the forward end of the shaft 24 is a beveled gear 25 which meshes with a beveled gear 26 secured axially to the adjacent end of the cutter reel 16 and revolves on the shaft 15. Thus as the trimmer is propelled over the ground the driving wheel 5 will, through the mechanism above described, impart rotative motion to the cutter reel 16 and the cutter blades 17 co-acting with the shear blade 18 will effectively cut the grass to the height at which the shear blade is supported by the idler roller 20. The hub of the gear 26 extends rotatably through an opening in the side of frame 13 and since the gear engages this side, it prevents outward displacement of the cutter reel from shaft 15.

In this construction the pivot shaft 6 about which the wheel 5 rotates, serves as a fulcrum on which the lever, composed of the handle 11, sills 7 and 8 and the frame portion 9 may be pivotally adjusted to bodily raise or lower the cutter mechanism. Also since the axial line of the frame 13 lies in a plane perpendicular to the axis of wheel 5 and is substantially horizontal in normal use, its pivotal mounting will permit the cutting reel 16 and blade 18 to swing radially about the axial line of the frame 13 to accommodate themselves to surfaces that are inclined upwardly or downwardly with respect to the horizontal surface on which the wheel 5 travels.

The utility of the device is well illustrated in Figure IV where the device is shown with the cutter reel 16 inclined downwardly from the side of the machine in order to trim closely to the ground on narrow sloping contours, which situation is frequently found in lawn trimming work, and where a regular type of lawn mower could not be utilized. It will be understood, of course, that the cutter reel 16 is free to pivot of its own accord by virtue of the pivoted mounting of the sub-frame 13 in the main frame 9, and the reel is governed in its pivotal movements by the contact of the idler roller 20 with the surface being trimmed. In the event that it is desired to retain the cutter reel 16 in any set position, I have provided a set screw 27 which is threaded in the depending frame portion 9a and which may be screwed down against the trunnion 14, thus preventing pivoting of the sub-frame 14 and subsequently of the reel 16.

It will also be noted that the cutter reel 16 extends entirely to one side of the machine as a whole, thus providing an outboard cutting mechanism which may operate in confined places not affording clearance for the entire machine or such machines having the cutting mechanism mounted between a pair of wheels as in the case of the commonly known type of lawn mower. Furthermore, the cutting blades 17 extend entirely to the outer free end of the cutter reel 16, and since there is no outboard bearing or other obstruction disposed outwardly of the ends of the cutting blades, it will be apparent that it is possible to trim grass growing closely along walls, fences, and numerous other objects which are commonly situated on or about lawns and greenswards.

While I have here shown and described a particular embodiment of the principles of my invention, I do not limit myself to the arrangement shown, since it will be obvious that certain changes may be made in the combination and arrangement of parts without departing from the spirit and scope of the invention. As an example of such change, I may prefer to mount the main frame 9 more directly to one side of the driving wheel 5 and modify the gearing arrangement which operatively connects the cutter reel 16 with the driving wheel 5, thus effectively reducing the overall length of the machine as a whole.

From the foregoing description it will be seen that I have provided a compact and simple device possessing marked utility as a lawn trimmer, and it is believed that the description is sufficiently clear so as to enable anyone skilled in the art to which the invention appertains to make and use the same, with reference, of course, to the accompanying drawing.

Having thus fully described my invention, I claim:

1. A lawn trimmer comprising a ground wheel, a main frame pivotally supported by the wheel axis and having a part thereof extended forwardly of the wheel and having a rearwardly directed handle portion for propelling the trimmer and whereby the elevation of the forward part may be regulated, a cutter mechanism supported from the forward part of the main frame and extending laterally thereof and having pivotal mounting thereon permitting the cutter mechanism to swing radially about a substantially horizontal axial line extending in the direction of travel of the ground wheel and means operatively connecting the ground wheel and cutter mechanism for operating the latter.

2. A lawn trimmer comprising a ground wheel, a main frame pivotally supported by the wheel axis and having a part thereof extended forwardly of the wheel and having a rearwardly extended handle portion for propelling the device and whereby the elevation of its forward part may be regulated at the will of the operator through the mediacy of the handle, a sub-frame pivotally mounted on the forward end part of the main frame for rotatable movement about a substantially horizontal axial line lying in a plane that is perpendicular to the axial line of the ground wheel and at one side thereof, a cutter mechanism fixed to the sub-frame and extending laterally thereof for swinging movement about the axial line of the sub-frame and a driving means for the cutter mechanism operatively connected with the ground wheel and actuated thereby.

3. A lawn trimmer comprising a ground wheel, a main frame pivotally supported by the wheel axis and having a part thereof extended forwardly of the wheel and having a rearwardly extending handle portion for propelling the device and whereby the elevation of the forward end part may be regulated by the operator through the mediacy of the handle, a sub-frame pivotally mounted in the forward end portion of the main frame at the underside thereof and laterally of the plane of the wheel for rotatable movement about an axial line that is substantially horizontal and extending in the direction of travel of the ground wheel, a rotary cutter mechanism mounted on the sub-frame and extended laterally thereof for swinging movement about the axial line of the sub-frame and a driving means operatively connecting the cutter mechanism and ground wheel.

4. A device of the class described, comprising a supporting and driving wheel, a frame rotatably supported by the wheel, a rotary cutter mechanism, a support therefor pivotally mounted in the frame and extended laterally thereof for vertical swinging movement; said cutting mechanism having a plurality of curved cutting blades cooperating with a stationary shear blade, an idler roller adjacent said cutting mechanism and swingable therewith and adapted to support the cutting mechanism at proper height above the ground, means including gearing interposed between said driving wheel and said rotary cutting mechanism adapted to rotate the latter as the former is propelled over the ground, means adapted to secure said rotary cutting mechanism in a set position about its pivoted mounting and a handle attached to said frame by means of which the device may be propelled and manipulated.

5. A device of the class described comprising a single supporting and driving wheel, a pair of frame sills between which said wheel is rotatably mounted, a main frame secured to said sills forwardly of said wheel and a handle secured to said sills rearwardly of said wheel, a sub-frame, means whereby it is pivotally attached to said main frame to rotate about a horizontal axis extending lengthwise of the main frame, a cutter reel rotatably mounted on said sub-frame and extending transversely to one side thereof, said cutter reel having a plurality of curved cutting blades secured thereon, a shear blade mounted on said sub-frame below said cutter reel and being adapted to coact with said cutting blades, an idler roller supported on said sub-frame adjacent said cutter reel and being adapted to support said reel and said shear blade at proper height above the ground, means including gearing interposed between said driving wheel and said cutter reel adapted to rotate the latter as the former is propelled over the ground, and means for securing said cutter reel, shear blade, and idler roller in any set position about the pivoted mounting afforded by the sub-frame.

ELMER HERBERT PETERSON.